Jan. 22, 1963 R. J. JOHNSON 3,074,615
CRATE AND HANDLE THEREFOR
Filed April 2, 1962 5 Sheets-Sheet 1

INVENTOR
RONALD J. JOHNSON
BY
ATTORNEY

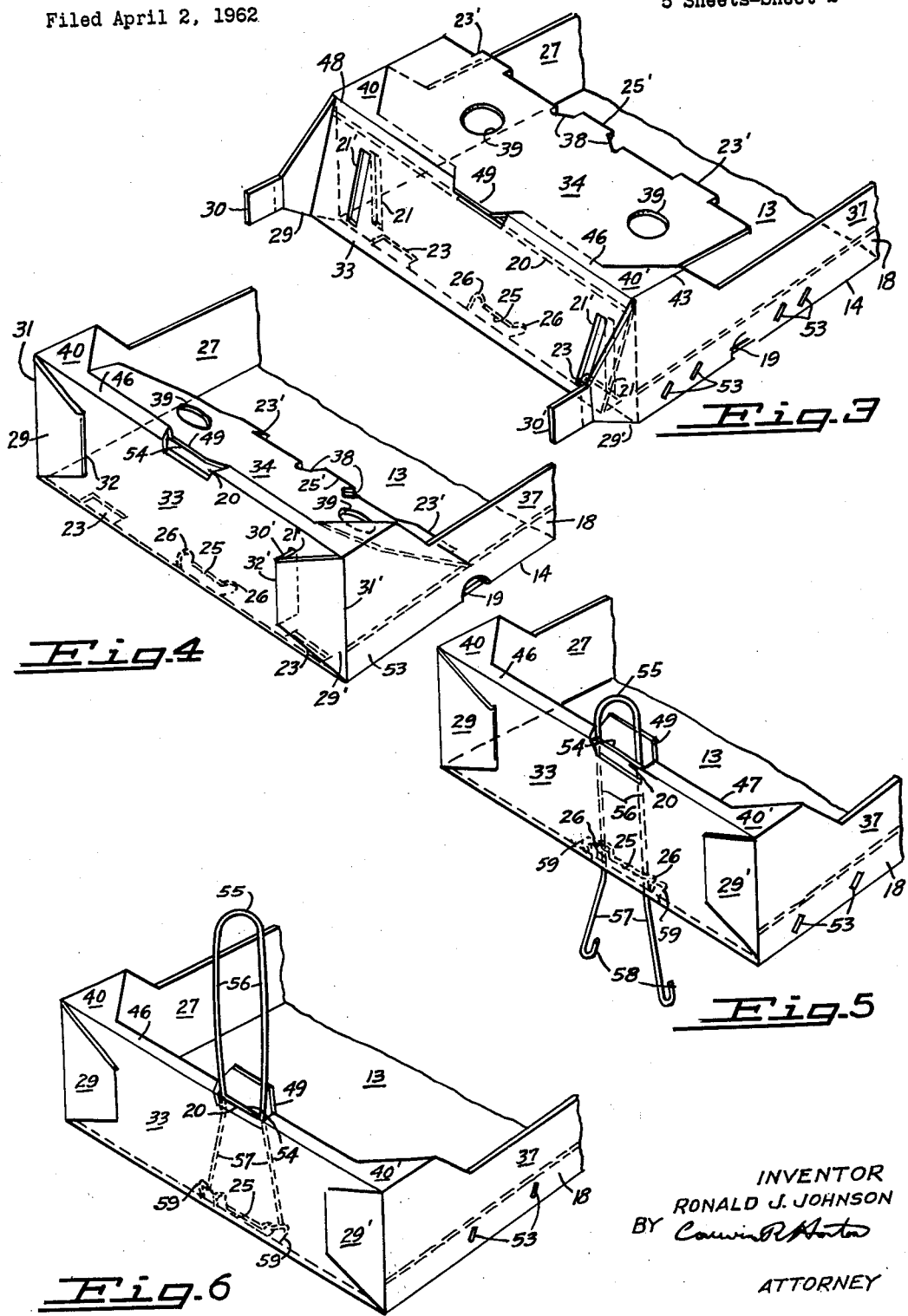

Jan. 22, 1963 R. J. JOHNSON 3,074,615
CRATE AND HANDLE THEREFOR
Filed April 2, 1962 5 Sheets-Sheet 3
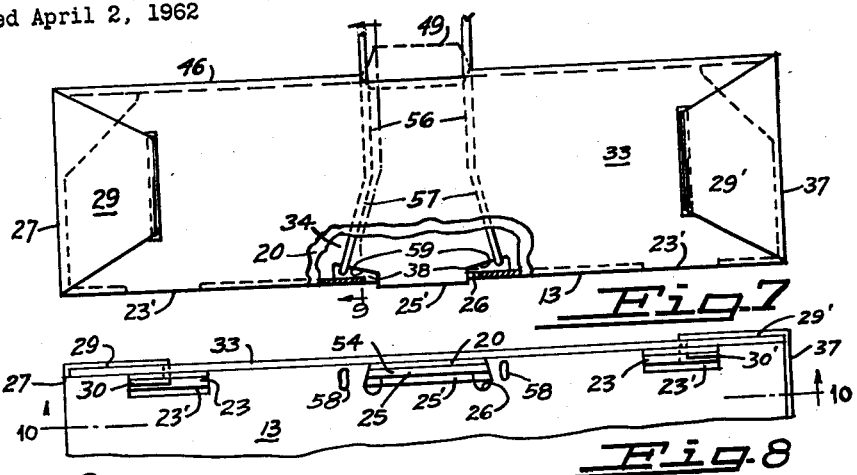
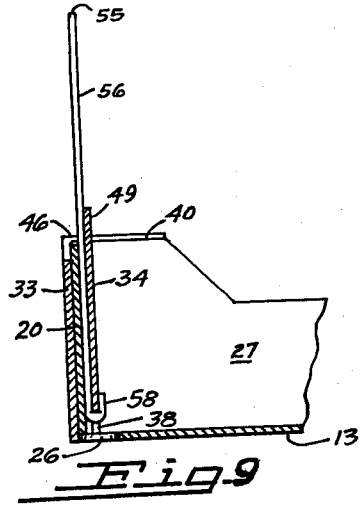
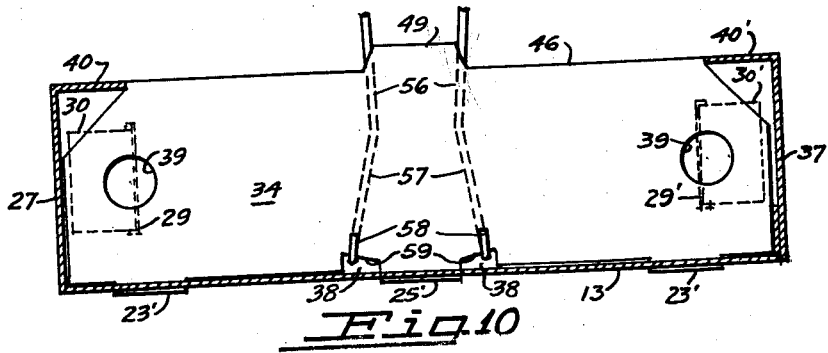
INVENTOR
RONALD J. JOHNSON
BY
ATTORNEY Jan. 22, 1963   R. J. JOHNSON   3,074,615
CRATE AND HANDLE THEREFOR
Filed April 2, 1962   5 Sheets-Sheet 4
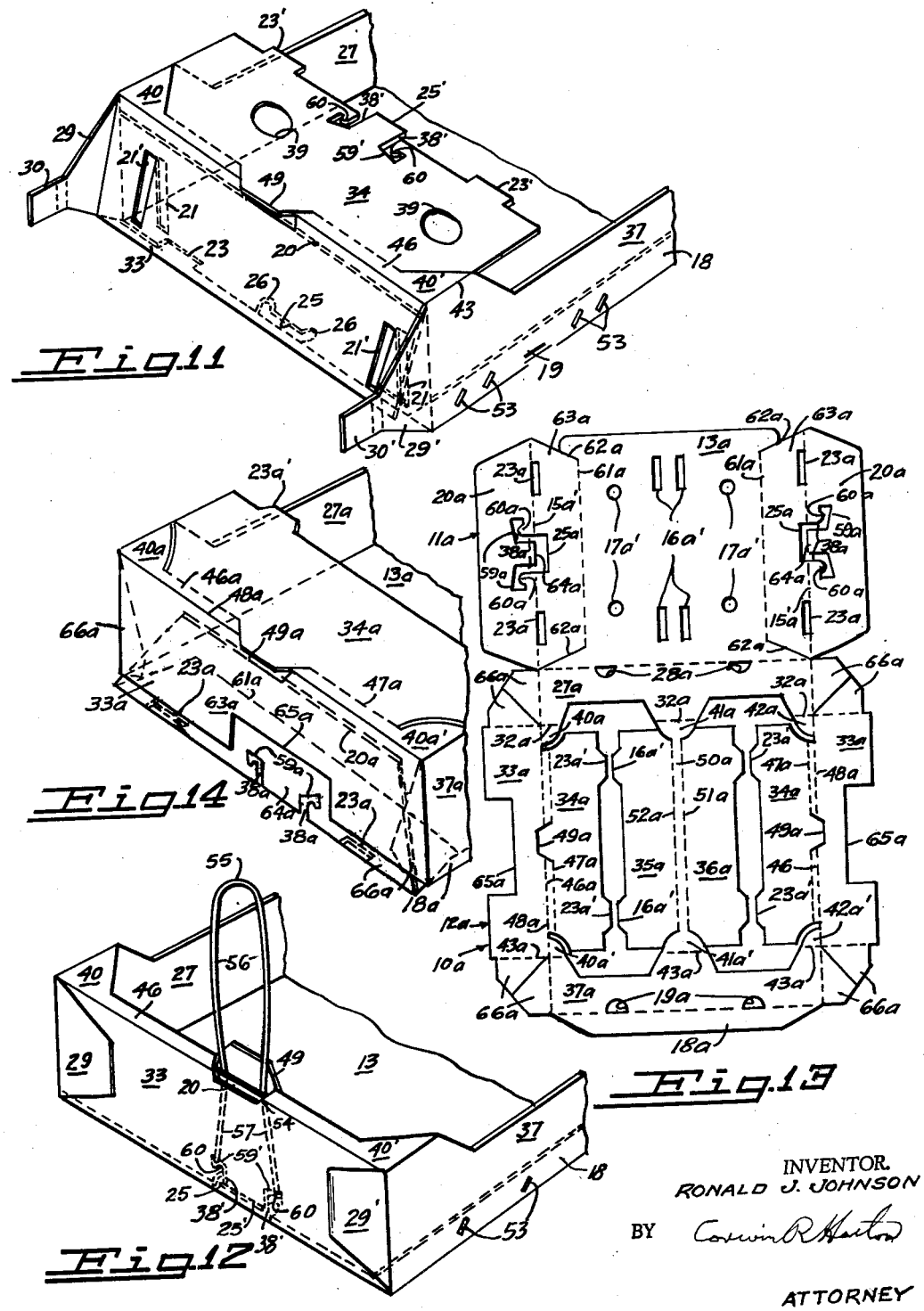
INVENTOR.
RONALD J. JOHNSON
BY
ATTORNEY Jan. 22, 1963 R. J. JOHNSON 3,074,615
CRATE AND HANDLE THEREFOR
Filed April 2, 1962 5 Sheets-Sheet 5
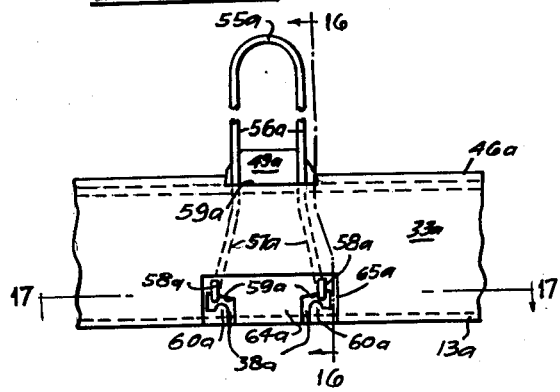
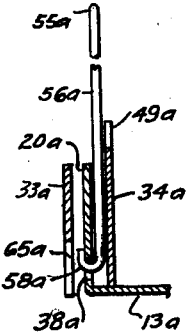
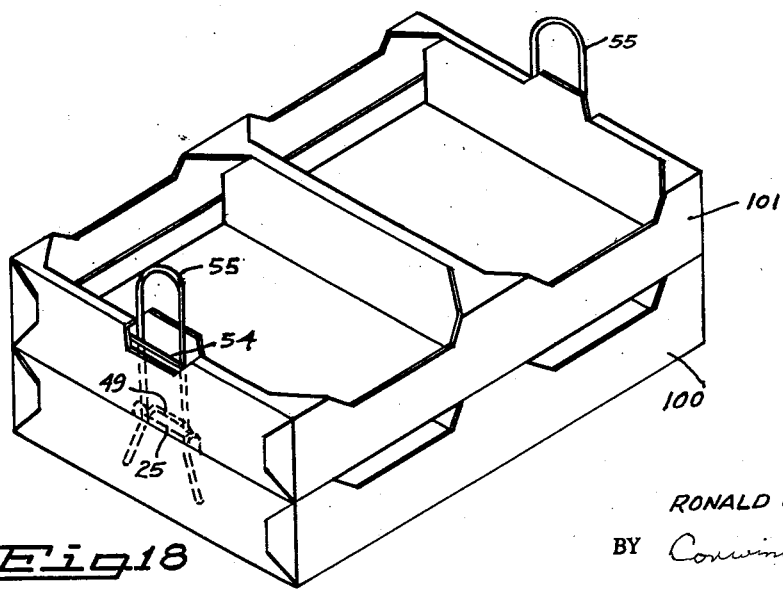
INVENTOR.
RONALD J. JOHNSON
BY
ATTORNEY United States Patent Office 3,074,615
Patented Jan. 22, 1963

3,074,615
CRATE AND HANDLE THEREFOR
Ronald J. Johnson, St. Louis, Mo., assignor to Crown Zellerbach Corporation, San Francisco, Calif., a corporation of Nevada
Filed Apr. 2, 1962, Ser. No. 184,125
12 Claims. (Cl. 229—52)

This invention relates to improvements in crates for shipping fruit, vegetables and other produce, and to handle constructions therefor. The invention is particularly adapted for crates of corrugated paperboard construction which are adapted for stacking and which are provided with means, including handles, for maintaining the trays or crates in proper stacked relation and for transporting the loaded trays or crates individually or in stacked units.

It is the general object of the present invention to provide a crate so constructed as to readily receive and rigidly engage removable handles and to provide specially constructed removable handles to cooperatively engage the crates constructed in accordance with this invention.

A number of crate and handle (or crate and interlocking device) constructions have been proposed previously. These include arrangements wherein the handle grasps a top web of the crate end wall (United States reissued Pat. No. 25,050); wherein the handle engages the bottom of the box at the end wall (United States Pat. No. 2,777,627); wherein the handle is secured between the floor and the top web of the crate end wall (2,990,995); and wherein the handle is secured to the mid portion of the end wall through appropriate holes therein (United States Pat. No. 2,944,722). Each of these arrangements has the disadvantage that (1) the handle is slow, difficult or impossible to insert and remove by hand into and out of a finished crate; (2) the handle has a weak grasp of the end wall; (3) the handle grasps the end wall at a structurally weak position; or (4) portions of the handle protrude from the end wall at undesirable positions. It is a general object of the present invention to provide crate and handle constructions which minimize all of these difficulties.

Further objects of this invention include:

(1) Provision of crate and handle structures in which the handle is easily secured to and removed from the crate by simple hand operations;

(2) Provision of a crate design whereby standard crates now in extensive commercial use, particularly those of corrugated paperboard construction, may by very slight alterations be adapted to receive handles in a strong rigid engagement highly resistant to tear-out or structural failure;

(3) Provision of a crate handle of simple construction requiring a minimum number of bends;

(4) Provision of crate and handle constructions in which the handle is removably engageable with the wall of the crate yet rigidly fixed against movement with respect to the crate wall in all directions including vertical movement in both directions;

(5) Provision of crate and handle constructions wherein, when the handle is engaged in the crate, no portion of the handle extends below the floor of the tray to interfere with lower trays or crates or to create a snag problem;

(6) Provision of crate and removable handle constructions in which the handle may be securely locked to the crate by simply inserting the handle into and through openings provided in the walls of the crate;

(7) Provision of crate and removable handle constructions of the above-described character which are adapted for stacking and in which the handle and means provided in the crates act to retain the crates in proper stacked relationship;

(8) And, provision of crate and removable handle constructions of the above-described character which may be advantageously adapted and used in crates of corrugated paperboard construction having multiple ply end walls.

The foregoing objects are fulfilled generally according to this invention by a crate provided with end walls adapted to receive closed end up therewithin a generally U-shaped handle, the legs of which handle each have a foot extending in the horizontal direction perpendicular to the plane of the handle, both to the same side thereof, the end wall adjacent the handle and to one side thereof having a cut-out with slots adapted to receive the handle feet, when the handle is inserted upwardly, to lock the handle against movement vertically in both directions. Various of the hereinafter described embodiments, which will give a full understanding of the construction and use of the crate and handle constructions, will make other and more specific objects apparent to those skilled in the art.

There are several embodiments of the invention, presented herein for purposes of illustration, relating to the crate and handle structures. It will be appreciated that the invention may be incorporated in other modified forms coming equally within the scope of the appended claims.

In the drawings:

FIGURE 3 is a fragmentary perspective view of the crate of FIGURES 1 and 2 in an intermediate phase of erection beyond that of FIGURE 2;

FIGURE 4 is a fragmentary perspective view of the crate of FIGURES 1 through 4 in fully erected condition, of erection beyond that shown in FIGURE 3;

FIGURE 5 is a fragmentary perspective view of the crate of FIGURES 1 through 4 in fully erected condition, with a handle inserted partially into the end wall thereof;

FIGURE 6 is a fragmentary perspective view of the crate of FIGURES 1 through 5, showing a handle in engaged position in the end wall thereof;

FIGURE 7 is an end elevational view of an end wall of the crate of FIGURES 1 through 6, showing in dotted outline a handle engaged therein;

FIGURE 8 is a bottom plan fragmentary view of the crate of FIGURES 1 through 7 taken at one end thereof and showing, in dotted outline, the feet of a handle engaged therein;

FIGURE 9 is a fragmentary sectional view taken along line 9—9 of FIGURE 7;

FIGURE 10 is a sectional view taken along line 10—10 of FIGURE 8, showing, in a fragmentary view, a handle engaged in the end wall of the crate;

FIGURE 11 is a fragmentary perspective view, illustrating the same type of crate as that of FIGURES 1 through 10, in an intermediate stage of erection, but showing a modified form of the invention;

FIGURE 12 is a fragmentary perspective view of the crate of FIGURE 11 in fully erected condition with a handle engaged in the end wall thereof;

FIGURE 13 is a top plan view of a generally rectangular corrugated board blank of a different type from that of FIGURES 1 through 12 and embodying a modified form of the invention;

FIGURE 14 is a fragmentary perspective view, partially broken away, illustrating the crate of FIGURE 13 in an intermediate stage of erection from the blank of FIGURE 13.

FIGURE 15 is a fragmentary end elevational view of the crate of FIGURES 13 and 14 in fully erected condition with a handle engaged in the end wall;

FIGURE 16 is a fragmentary sectional view taken along line 16—16 of FIGURE 15;

FIGURE 17 is a fragmentary sectional view taken along line 17—17 of FIGURE 15;

FIGURE 18 is a perspective view of several stacked crates with handles, embodying the invention.

*Embodiment of FIGURES 1 Through 10*

Figure 1:
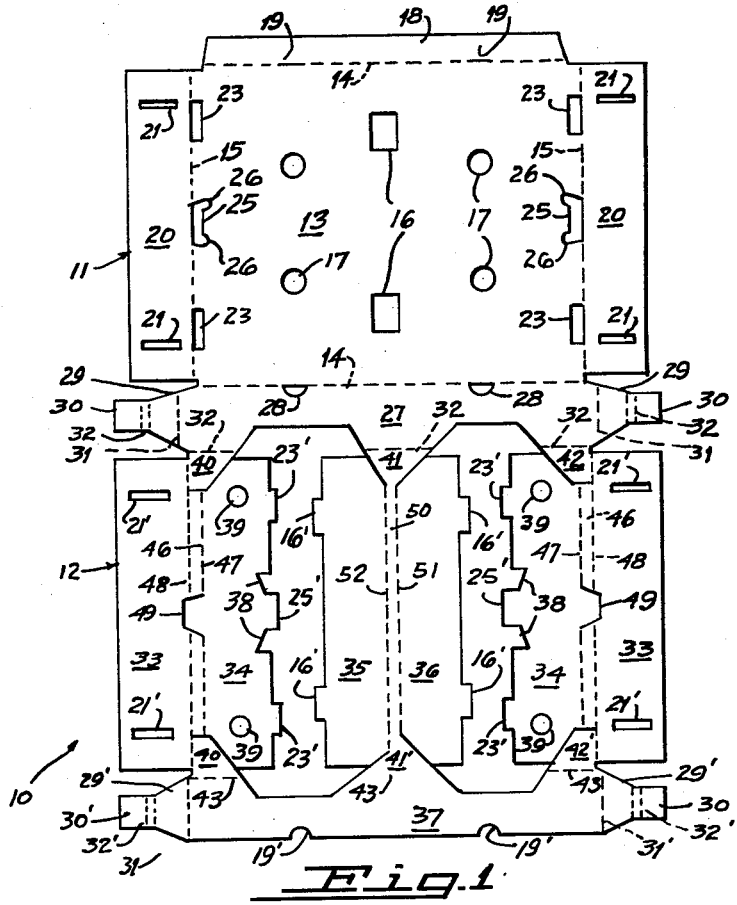
FIGURE 1 is a top plan view of a paperboard blank employed in fabricating the shipping crates, in one form.

FIGURE 1 of the drawings illustrates a flat paperboard blank 10, preferably of corrugated board stock suitably treated to resist moisture, which is died out in an elongated, generally rectangular outline. Blank 10 consists of one side wall and bottom forming section 11 and partition and the other side wall forming section 12.

Section 11 comprises a rectangular bottom forming panel 13 outlined by opposed pairs of longitudinal and transverse creases 14 and 15, respectively. Panel 13 is provided on each side of the longitudinal center line thereof with a transversely elongated partition latching slot 16, and it is also provided with a number of ventilating openings designated 17. A side wall securing flap 18 of longitudinally elongated, rectangular shape is integrally hinged to the upper edge of bottom panel 13 by one of the creases 14 and contains ventilating apertures 19.

Intermediate side wall panels or plies 20 are integrally hinged to panel 13 by end margin forming creases 15 and are each provided with pairs of locking tab slots 21 located near their ends.

Inner end wall panel latching slots are provided at either end of panel 13 adjacent fold creases 15. These include pairs of side latching slots 23 and central latching slots 25, the latter of which also serve an additional function as hereinafter related.

Side wall 27 is integrally hinged to the bottom side of panel 13 by one of the creases 14 and contains ventilating openings 28. Located at the ends of side wall 27 are locking extensions 29 each having a locking tab 30 located at its outer end. Both locking extensions and tabs are hinged at creases 31 and 32, respectively.

The partition and other side wall forming section 12 is integrally hinged to side wall panel 27 at longitudinal crease 32. It comprises pairs of opposed side wall forming panels 33 and 34 at either end; central partition forming panels 35 and 36; and, side walls 37, all of which are interconnected by means of triangular webs 40–42 and 40'–42'. It can be seen that section 12 is also hinged to panel 27 by means of triangular webs 40–42.

Outer end wall panels or plies 33 each have pairs of locking tab slots 21' located near their ends. Inner end wall panels or plies 34 have latching tabs 23' located near their ends and latching tabs 25' centrally located thereon. Cut-outs in the form of slots 38 are provided in panels 34 which are described hereinafter in greater detail. Ventilating openings 39 are also provided in panels 34. Pairs of latching tabs 16' are provided on both partition panels 35 and 36.

Side wall 37 is provided at each end with end wall locking extensions 29' and locking tabs 30' at the outer ends thereof. Extensions 29' are each integrally hinged to side wall 37 at creases 31' and tabs 30' are each integrally hinged at creases 32' to one of extensions 29'. Ventilation openings 19' are provided in side wall 37.

Side wall 37 is integrally hinged at crease 43 to both pairs of end wall panels 33 and 34 and partition panels 35 and 36 by means of triangular webs 40', 41' and 42'.

At both ends of section 12, end panels 33 and 34 are hingedly connected at their adjacent edges to a rectangular, transversely-elongated top end wall web 46 which is outlined by creases 47 and 48. Panels 33 and 34 are integrally hinged to web 46 along creases 48 and 47, respectively. Panels 34 are slit-freed from webs 40 and 40' and 42 and 42', respectively to allow them to hinge around creases 47. A slit-freed tab 49 connected to panel 34 is located centrally in each web 46.

Rectangular, transversely-elongated web 50 connects partition panels 35 and 36 at their adjoining edges and is integrally hinged to panels 35 and 36 along creases 52 and 51, respectively. Panels 35 and 36 are slit-freed from webs 41 and 41' to permit them to hinge around creases 52 and 51.

The finer details of crate blank 10 will not be discussed here inasmuch as the present application is not directed to them or they are described in greater detail later on. The interrelation of the various parts of blank 10 will be made clear in the description of the fabrication of the crate from blank 10 which follows.

Figure 2:
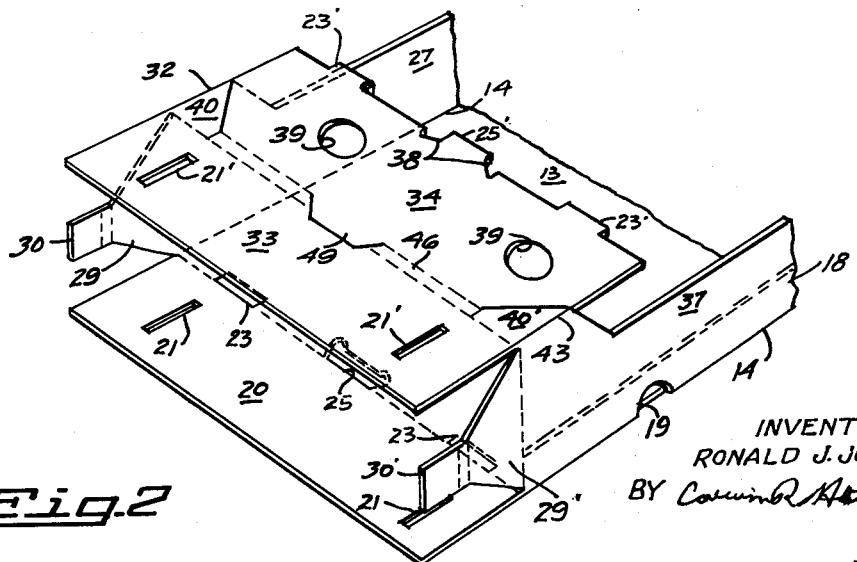
FIGURE 2 is a fragmentary perspective view, illustrating the crate in an intermediate phase of the operation of erecting the same from the blank of FIGURE 1 to a fully erected condition.

In FIGURE 2 the various parts correspond by reference number to the corresponding parts of blank 10 in FIGURE 1. As shown in FIGURE 2, the crate is formed from blank 10 of FIGURE 1 by folding section 12 upwardly and over section 11 about creases 14 and 32. This leaves side wall 27 in an upstanding position with section 12 extending above and parallel to panel 13. Next, side wall securing flap 18 is folded upwardly about crease 14 and end wall 37 is folded downwardly about crease 43. In this position flap 18 overlaps side wall 37 to the inside of the crate. Side wall 37 is secured to tab 18 at this overlap by means of adhesive, staples or the like. FIGURE 3, in which the crate is in a more advanced stage of erection, shows staples 53 securing tab 18 to side wall 37.

In FIGURE 3, intermediate panel 20 has been folded upwardly around crease 15 to a vertical position and outer wall 33 has been folded downwardly about crease 48 towards a vertical position. It can be seen from this view that locking tab slots 21 on intermediate panel 20 and locking tab slots 21' on outer panel 33 register one over the other when panels 20 and 33 have been rotated to vertical parallel positions adjacent one another. This stage of erection is reached in FIGURE 4, wherein locking extensions 29 and 29' have been rotated inwardly of the crate end wall around creases 31 and 31', respectively. Likewise, locking tabs 30 and 30' have been rotated around crease 32 and 32', respectively, and each inserted through a pair of registered openings 21' and 21 in wall panels 33 and 20. Locking tabs 30 and 30' are each rotated another 90 degrees to extend outwardly along the end wall and parallel thereto.

This step has been completed in FIGURE 5 and inner panel 34 has been rotated around crease 47 to a vertical position in which latching tabs 23' and 25' are received in tab slots 23 and 25, respectively, in latched relationship. In the vertical position, panel 34 is adjacent tabs 30 and 31' to hold these tabs in their rotated positions parallel to wall panel 20. Reference is made to FIGURE 8, a bottom view of the crate at the end wall, for a clearer picture of this arrangement. FIGURE 8 also affords a clearer picture of the engagement of tabs 23' and 25' in slots 23 and 25, respectively.

Referring back again to FIGURE 5, it can be seen that slit-freed tab 49 has been caused to move to a vertical position by rotation of inner panel 34, to which it is connected.

This movement also has exposed a central opening 54 in top web 46, this being the opening created by removal of tab 49. Opening 54 is directly above central latching slot 25 and communicates therewith through the space between panels 20 and 34.

Also seen in FIGURE 5 is handle 55 of a generally U-configuration. Legs 56 of handle 55 have bottom portions 57 which angle or flare outwardly from the parallel portions and legs 56 terminate in feet 58 which extend in a direction perpendicular to the plane of the body of the handle and both to the same side thereof. In this case, both feet extend toward the interior of the crate. Handle 55 is received by the crate end wall by insertion closed end up, upwardly through slot 25, between intermediate panel 20 and inner panel 34 and through opening 54 in web 46. As shown in FIGURE 5, the handle has been inserted part-way into the end wall to a position where the parallel leg portions are entirely inside the end wall. The parallel leg portions 56 lie at the outer ends of openings 54 and 25. As the handle is pulled farther up into the end wall, the handle legs are cammed towards each other by the outer ends of slot 25 operating on the flared leg portions 57. The handle may be pulled entirely through slot 25 as inward extensions in slot 25 are provided at the ends thereof to accommodate feet 58 when they are pulled upwardly beyond crate floor 13.

When the handle feet 58 have cleared floor 13 and are entirely within the end wall, the outer ends of slot 25 no longer serve to confine the handle legs to a compressed inward position and the legs therefore expand outwardly to the relaxed or engaged position shown in FIGURE 6. At this position, handle feet 58 are confined in a cut-out comprising slots 38 as can be seen more clearly in FIGURES 7 through 10. Referring to FIGURES 7, 8 and 9, the handle legs are seen in engaged position in the end wall with the handle feet to the outside of slot 25 where they engage the floor 13 below and the top edges 59 of slots 38 above. Reference is made to FIGURE 9 to show more clearly feet 58 engaged at the upper edge of slots 38 in inner panel 34. It can be seen that handle 55 in this position is secured against upward vertical movement by virtue of the foot engagement with wall panel 34 and against downward vertical movement by virtue of floor 13 directly below handle feet 58. Since handle legs 56 are in relaxed position when engaged, they must be compressed towards each other to move handle feet 58 inwardly to register with slot 25 in order to disengage the handle. The portion of the handle extending above the end wall may be compressed to move the handle feet inwardly to register with slot 25 and the handle may then be moved downwardly through slot 25 to disengage it from the end wall.

Referring to FIGURE 10, the upper edges of slots 38 extend outwardly at an angle above the horizontal to provide camming surfaces to assist movement of legs 56 outwardly when the handle is pulled upwardly to a point where feet 58 engage the inner portions of edges 59. Edges 59 serve the further function of retarding inward movement of handle feet 58 when the handle is grasped in use, thus assisting in the prevention of accidental disengagement of the handle.

Tab or extension 25' also assists in this function by providing an inner stop to inward movement of legs 56 and they also serve to assist in registering handle feet 58 with slot 25 when handle legs 56 are compressed to disengage the handle from the end wall.

Since the construction of the other end wall and handle engagement therein is exactly as described above for the one end wall, this description will not be repeated. The central partition, not shown in completed condition, is formed simply by folding panels 35 and 36 downwardly around creases 52 and 51 to vertical positions parallel with each other and engaging tabs 16 in slots 16' in the crate floor.

Embodiment of FIGURES 11 and 12

Another embodiment of the invention is shown in FIGURES 11 and 12 in which the same type of crate is employed as that shown in FIGURES 1 through 10. FIGURE 11 corresponds to FIGURE 3 as to the state of erection and the various features of the crate except as hereinafter related. Likewise, FIGURE 12 corresponds to FIGURE 6 as to the various crate features except as hereinafter related.

As shown in FIGURE 11, instead of a cut-out comprising a pair of generally rectangular slots 38, a cut-out comprising a pair of generally L-shaped slots is provided. These slots extend upwardly from the bottom edge of inner panel 34 and in either direction outwardly horizontally along panel 34 to provide horizontally disposed slot portions therein. The upper edges 59' of these slots are oriented at an angle above the horizontal as they extend outwardly for the same purposes and reasons as indicated for slots 38 in the embodiment of FIGURES 1 through 10. In addition, retaining lips 60 are provided at the inner ends of the bottom edge of the horizontally disposed slot portions to retard inward movement of the handle feet when they are engaged therein. A tab or extension 25' is also provided centrally of the cut-out between the horizontally disposed slot portions as in the embodiment of FIGURES 1 through 10.

As in the case of the embodiment of FIGURES 1 through 10, handle 55 is pulled upwardly through slot 25 until feet 58 of the handle have passed completely therethrough. However, in this case feet 58 engage slots 38' which are each directly above one end of floor panel slot 25. As handle 55 is pulled upwardly in slots 38' they reach a position directly opposite the horizontally extending slot portions therein and, due to the compression of legs 56, feet 58 are carried outwardly into the horizontally extending slot portions to the outer ends thereof. In this position handle legs 56 are relaxed and handle feet 58 are engaged in panel 34 against vertical movement upwardly by virtue of the upper edges 59' of the horizontally disposed slot portions and against vertical movement downwardly by virtue of the bottom edges of the horizontally disposed slot portions.

To remove the handle, handle legs 56 must be compressed inwardly in order to move handle feet inwardly to register with the vertical extending portions of slots 38' and then the handle may be moved downwardly to remove it from the end wall. Construction of the other end wall is exactly the same as the end wall described, so description thereof is omitted.

In the embodiments of FIGURES 1 through 12, the handle feet 58 extend inwardly into the interior of the crate. This is much less of a problem than having the handle fastening members extending below the floor of the crate or elsewhere to the outside of the crate since generally this type of crate is used to carry a group of boxes having side walls which slant inwardly toward their bottoms a distance sufficient to clear the inner ends of the handle feet even when these boxes are carried adjacent the end walls.

Embodiment of FIGURES 13 through 17

FIGURES 13 through 17 show a different form of the invention quite similar to that of FIGURES 11 and 12. This invention is embodied in a crate of somewhat different construction from the crate previously described. The basic features are the same as those in the crate of FIGURES 1 through 12 and the various features correspond insofar as the reference numerals (appended with an "a") correspond. In view of this, the crate itself will be described only insofar as it differs from the previously described crate. Reference may be had to the prior art patents previously cited for a more detailed description of crates of the general nature of this and the previously described crate.

In FIGURE 13, 10a is a blank similar to blank 10 previously described. However, in this case a flap 18a, hinged at 24a, is provided at the lower edge of the partition and other side wall forming section 12a rather than at the top edge of side wall and bottom forming section 11. Rather than locking tabs, tuck flaps 66a are provided at all four corners of section 12a for securing the end wall panels in place. Outer portions of floor 13a, designated 63a, are hinged at creases 61a and slit-freed at their outer ends so that these portions of the floor may be rotated downwardly to facilitate erection of the end walls as hereinafter related.

A cut-out 65a is provided centrally along the bottom side of each outer panel 33a for reasons hereinafter related. In this embodiment, slots 25a are contiguous with slots 38a to form a single central end wall cut-out since slots 38a are located at the bottom edge of each intermediate panel when erected, rather than at the bottom edge of each inner panel as in the embodiments of FIGURES 1 through 12.

FIGURE 14 shows the crate prepared from blank 10a in the stage of erection roughly corresponding to that of FIGURES 3 and 11 in the previously described embodiments. However, in this case, tabs 68a are folded inwardly of the crate end wall and, when panel 33a is rotated downwardly about crease 48a to the vertical position, the pairs of tabs 68a at each end of the end wall (one hinged to the side wall and the other to the outer panel) assume parallel adjacent positions parallel to panel 33a. End portion 63a of bottom 13a is rotated downwardly about crease 61a to bring the upper edge of intermediate panel 20a below tabs 66a. Then panel 20a is inserted upwardly between panel 33a and tabs 66a as shown in FIGURE 14. Bottom section 63a is rotated upwardly until panel 20a is fully inserted and section 63a is again in the same plane as the remainder of floor 13a. By this means outer panel 33a is securely attached to intermediate panel 20a to form a rigid unit. As in the previous embodiments, panel 34a is rotated downwardly about crease 47a until it assumes the vertical position and tabs 23a' are inserted in slots 23a. Thus installed, panel 34a is adjacent to and parallel with tabs 66a to assist in preventing their disengagement from behind panel 20a. The construction of the other end wall is exactly as described for this end wall and the central partition is formed exactly as previously related for the crate of FIGURES 1 through 12.

Referring now to FIGURES 15 through 17, the crate end wall is shown in fully erected condition with a handle 55a shown in engaged position. Handle 55a corresponds in all respects to handle 55 of the previous embodiments. As in the previous embodiments, slot 25a in the floor panel registers with the space between inner panel 34a and intermediate panel 20a and is located directly below and aligned with opening 54a in web 46a at the top of the end wall. The ends of slot 25a lie directly below the vertically extending portions of slots 38a so that when the closed end of handle 55a is inserted upwardly through slot 25a and through the space between inner panel 34a and intermediate panel 20a, legs 56a are cammed inwardly by virtue of the ends of slot 25a acting upon outwardly extending leg portions 57a so that handle feet 58a will move through slot 25a and directly upwardly into slots 38a. It is to be noted that the handle in this case is inserted with feet 58a extending outwardly of the crate and outwardly of intermediate panel 20a rather than inwardly as shown in previous embodiments. The handle is then pulled upward in slots 38a until feet 58a are adjacent the horizontally extending portions of slots 38a at which point legs 56a are free to expand outwardly to position feet 58a at the outermost ends of the horizontally extending portions of slots 38a in the cut-out. In this position feet 58a engage intermediate panel 20a upwardly at top edge 59a of the horizontally extending slot portions and downwardly against the bottom edges of the horizontally extending slot portions. Lips 60a are provided at the inner ends of the bottom edges of the horizontally extending slot portions to impede inward movement of feet 58a. For the same reasons and purposes as indicated in the previous embodiments the upper edges of the horizontally extending slots are slanted above the horizontal as they extend outwardly and extension 64a located centrally of the horizontally extending slot portions is provided.

The advantage of the embodiment of FIGURES 13 through 17 is that the handle feet extend outwardly of the end wall away from the interior of the crate. Thus positioned, they cannot damage the contents of the crate, and, since the handle feet do not extend outwardly beyond the outer panel of the end wall, there is little chance of snagging adjacent crates, etc. If there is a problem even in this arrangement, the cut-outs 65a in outer panels 33a may be eliminated to provide a continuous outer panel adjacent to the handle hooks 58a to act as an outer guard to prevent snagging. This particular embodiment is not preferred since there is a tendency for the outer panel to impede engagement of the handle due to contact between the handle feet and the inner side of the outer wall. However, this embodiment is within the scope of this invention.

In the embodiment of FIGURES 13 through 17, as well as the embodiment of FIGURES 11 and 12, the panel adjacent the handle in which the handle feet are not engaged should preferably be sufficiently close to the handle and fixed in position firmly enough to prevent the handle from slipping laterally away from the engaged panel out of engagement with the engaged wall.

*Additional Embodiments of the Invention*

While it is preferred to arrange the invention for a corrugated crate having end walls of three or more plies, only two plies are required since the handle can be inserted and held between the two plies and secured by its feet in a cut-out in one or the other of the plies or between a cut-out in one or the other of the plies and the crate floor of the crate as hereinbefore described.

While the preferred construction material is corrugated paperboard, it is celar that other materials may be used in construction of crates in accordance with the present invention. For instance, bendable material such as metal sheet or plastic sheet may be constructed into crates of the present invention in the manner previously related for the preferred embodiments. In addition, crates of the present invention can be formed from crates having unitary end walls in which the appropriate openings and cut-outs may be fashioned. A centrally located longitudinally elongated opening in the end wall extending from the top to the bottom thereof of a width to accommodate a handle in relaxed condition may be provided. Likewise, an opening can be provided in the floor of the crate registering with the elongated opening in the end wall thereof for receiving the handle therethrough (including the outwardly extending feet). A cut-out to one side of the end wall opening at the bottom edge thereof can be provided for receiving the handle feet and this cut-out can include horizontally extending slot portions outwardly of and above the vertical slot portions of the cut-out in both directions for engaging the handle feet against vertical movement in both directions as described previously.

The cut-out at the bottom edge of the wall panel may be made in two panels rather than one for additional strength. For instance, in the case of the embodiment of FIGURES 13 through 17, cut-out 65a in outer wall panel 33a may be eliminated to provide a continuous panel and an identical cut-out may be made in outer panel 33a corresponding to and registering with slots 38a in panel 20a. Feet 58 of handle 55 would then be extended outwardly an additional distance to embrace and engage both panels 20a and 33a when the handle is pulled upwardly into engaged position. In this manner, panels 20a and 33a are used, in effect, as a single ply or panel.

Handle Construction

Although an end wall top web is not necessary, if one is provided, the upper opening therein should be of such a width as to allow the handle legs to expand outwardly into engaged position in the end wall. This requirement will be governed by the configuration of the legs of the handle which may be straight, curved, bent or otherwise flared as desired. In the embodiments shown, the legs are flared outwardly at a point below the top edge of the end wall (when engaged) so that when the handle is engaged the upper portion of the handle legs are in parallel relaxed position at the ends of the top opening.

The handle is preferably resilient so as to automatically engage when pulled upwardly into the end wall; however, a deformable handle may be used, engagement being accomplished by manually moving and deforming the handle legs outwardly into engaged position or by an upward pull on the handle to cam the handle feet into engaged position by virtue of the camming surfaces provided at the upper edge of the horizontally extending portions of the cut-out slots. Provision of retaining lips at the inner ends of the slots will assist in retaining the handle thus engaged.

The handle is designed of a length to extend upwardly a substantial distance beyond the top edge of the end wall when engaged, both to provide a grasping handle and to provide a stacking interlocking extension. The portions of the handle legs extending above the top edge of the end wall may be squeezed together in order to disengage the handle feet to remove the handle downwardly from the end wall.

Stacking Feature

The stacking feature is illustrated by FIGURE 18 in which a crate 101 is stacked with crate 100. Both tab 49 of and handle 55 engaged in crate 100 extend through bottom floor slot 25 of crate 101 and handle 55 extends on upwardly through top opening 54 to provide a graspable handle thereabove. By these means provided at both end walls, crates 100 and 101 are firmly interlocked in stacked arrangement. An additional crate may be stacked on top of crate 101 (receiving the ends of handles 55) with handles engaged in the end wall thereof and the previously described arrangement may be repeated until the stack of crates is as high as is desired.

While a number of embodiments of the invention have been described in detail, it will be understood that this is for illustration only and is not intended as a definition of the scope of the invention, reference being had for this puropse to the appended claims.

Having thus disclosed the invention, I claim:

1. A crate construction comprising a crate having an end wall, said end wall having an opening extending vertically from the top to the bottom thereof adapted to receive a generally U-shaped resilient handle, each leg of which terminates in a foot extending in a direction perpendicular to the plane of the body of said handle and to the same side thereof, a cut-out in said wall to one side of said wall opening extending upwardly from the bottom edge of said end wall a substantial distance and outwardly horizontally in both directions along said one side to form slots therein to either side of the vertically extending portion of said cut-out for receiving said handle feet in engaged relation when said handle is pulled upwardly into said end wall to a position where the handle feet are adjacent said slots and the handle legs are moved outwardly.

2. A crate construction comprising a crate having a multi-ply end wall adapted to mount therein a generally U-shaped resilient handle, each leg of which terminates in a foot extending in a direction perpendicular to the plane of the body of said handle and to the same side thereof, said end wall including two spaced plies, a floor extending under and to the outside of the inner spaced ply and having an opening therein registering with the space between said two spaced plies adapted to receive said handle therethrough with the closed end upwards when the legs of the handle are compressed inwardly from their normal positions, and a cut-out in one of said spaced plies above the bottom edge opening, said cut-out extending outwardly horizontally in both directions along said one ply to form horizontally disposed slots therein to both sides of the vertically extending portion of said cut-out for receiving said handle feet in engaged relation when said handle is pulled upwardly into said end wall to a position where the handle feet are adjacent said slots and the handle legs are moved outwardly.

3. A crate construction comprising a crate having a floor and a multi-ply end wall adapted to receive a generally U-shaped resilient handle therethrough, each leg of which terminates in a foot extending in a direction perpendicular to the plane of the body of said handle and to the same side thereof, said end wall including an inner, an intermediate and an outer ply, a crate floor, said crate floor extending to and connecting with the bottom edge of said intermediate ply, a web forming the top edge of said end wall and connecting said inner and said outer plies in spaced relation, vertically aligned openings in said top web and in said crate floor registering with the space between said intermediate ply and said inner ply, adapted to receive said handle therethrough with the closed end upwards when the legs of the handle are compressed inwardly from their normal positions, a cut-out in said intermediate ply above said floor opening and communicating therewith, said cut-out extending upwardly from said floor opening a substantial distance and outwardly horizontally in both directions along said intermediate ply to form horizontally disposed slots therein to both sides of the vertically extending portion of said cut-out for receiving handle feet in engaged relation when said handle is pulled upwardly into said end wall to a position where the handle feet are adjacent said slots.

4. A crate construction as in claim 3 and wherein the upper edges of said slots extend outwardly at an angle above the horizontal to provide a camming surface for moving said handle feet into the outermost portions of said slots, wherein lips are provided on the lower edge of said slots at the inner ends thereof to impede disengagement of said handle feet and wherein said upwardly extending portion of said cut-out comprises two vertically extending channels, each at one side of said floor opening and each connecting with one of said horizontally disposed slots.

5. A crate construction comprising a crate having an end wall, an opening in said end wall extending vertically from the top to the bottom of said end wall and adapted to receive a handle therethrough, a cut-out in said end wall to one side of said elongated opening extending upwardly from the bottom edge of said end wall a substantial distance and outwardly horizontally in both directions along said one side to form slots therein to either side of the upwardly extending portion of said cut-out and a generally U-shaped resilient handle of a width to fit through said elongated opening with the closed end up when the legs of the handle are compressed inwardly from their normal position and of a length to extend upwardly beyond the top edge of the wall when engaged therein, said legs each terminating in a foot extending in a direction perpendicular to the plane of the body of said handle and to the same side thereof, whereby, when said handle is inserted with its feet extending toward said one side and is moved upwardly through said elongated opening to the point where each handle foot is adjacent a horizontally disposed channel of said cut-out, said handle legs spring outwardly to position each of said feet to the opposite side of said cut-out in said slots where they each engage said side to lock the handle against vertical movement in either direction.

6. A crate construction comprising a crate having a multi-ply end wall including two spaced plies, a floor extending under and to the outside of the inner spaced ply and having an opening therein registering with the space between said two spaced plies, a cut-out in one of said spaced plies above the floor opening, said cut-out extending upwardly from the bottom edge of said one ply a substantial distance and outwardly horizontally in both directions along said one ply to form horizontally disposed slots therein to either side of the vertical portion of said cut-out and a generally U-shaped resilient handle of a width to fit through said vertically aligned openings with the closed end up when the legs of the handle are compressed inwardly from their normal positions, and of a length to extend upwardy beyond the top edge of the wall when engaged therein, said legs each terminating in a foot extending in a direction perpendicular to the plane of the body of said handle and to the same side thereof, whereby, when said handle is inserted with its feet extending toward said one ply and is moved upwardly through said end wall openings to the point where each handle foot is adjacent a horizontally disposed channel of said cut-out, said handle legs spring outwardly to position each of said feet to the opposite sides of said cut-out in said slots where they each engage said one ply to lock the handle against vertical movement in either direction.

7. A crate construction comprising a crate having an end wall, said end wall having an opening extending vertically from the top to the bottom thereof adapted to receive a generally U-shaped resilient handle therethrough, each leg of which terminates in a foot extending in a direction perpendicular to the plane of the body of said handle and to the same side thereof, a crate floor extending under the end wall, an opening in said floor registering with said end wall opening and extending under said end wall to one side of said wall opening, said floor opening being of a width to receive said U-shaped resilient handle therethrough with its closed end up when the legs of the handle are compressed inwardly from their normal positions, and a cut-out in said end wall to said one side of said end wall opening extending upwardly from the bottom edge of said end wall directly above said floor opening and outwardly in the horizontal direction along the bottom edge of said one side substantially beyond said floor opening in both directions to form slots between said floor and said end wall to both sides of said floor opening for receiving said handle feet in engaged relation when said handle is pulled upwardly into said end wall opening to a position where the handle feet are adjacent said slots and the handle legs are moved outwardly.

8. A crate construction comprising a crate having a multi-ply end wall adapted to mount therein a generally U-shaped resilient handle, each leg of which terminates in a foot extending in a direction perpendicular to the plane of the body of said handle and to the same side thereof, said end wall including two spaced plies, said crate having a floor extending to and under the inner of said spaced plies, an opening in said floor registering with the space between said two spaced plies adapted to receive said handle therethrough with the closed end upwards, said opening in said floor extending inwardly of said end wall beyond the inner of said two spaced plies, and a cut-out in the bottom edge of said inner of said two spaced end wall plies directly above said floor opening and extending in the horizontal direction along the bottom edge of said inner spaced ply substantially beyond said floor opening in both directions to form horizontally disposed slots between the inner panel bottom edge and the crate floor to both sides of said floor opening for receiving said handle feet in engaged relation when said handle is pulled upwardly into said end wall to a position where the handle feet are adjacent said slot and the handle legs are moved outwardly.

9. A crate construction comprising a crate having a multi-ply end wall adapted to receive a generally U-shaped resilient handle, each leg of which terminates in a foot extending in a direction perpendicular to the plane of the body of said handle and to the same side thereof, said end wall including an inner, intermediate and an outer ply in spaced relation, a crate floor, said floor extending to and connected with the bottom edge of said intermediate ply, a web forming the top edge of said end wall and connecting said inner and said outer plies in spaced relation, vertically aligned openings in said top web of said end wall and in said crate floor registering with the space between said inner and said intermediate plies, said opening in said crate floor extending under said inner ply and being of a width to receive said handle therethrough when said legs of said handle are compressed inwardly from their normal positions, a cut-out in the bottom edge of said inner ply directly above said floor opening and extending horizontally along the bottom edge of said inner ply substantially beyond said floor opening in both directions to form horizontally disposed slots therein to both sides of the floor opening for receiving said handle feet in engaged relation when said handle is pulled upwardly into said end wall to a position where the handle feet are adjacent said slots.

10. A crate construction as in claim 9 and wherein the upper edges of said slots extend outwardly at an angle above the horizontal to provide a cam surface for moving said handle feet to the outermost points of said slots and including a projection on the lower edge of said inner ply located centrally of said floor opening to divide said cut-out into two portions and to provide an inner stop for each of said slots to limit inward movement of said handle feet when said handle legs are compressed.

11. A crate construction comprising a crate having an end wall, said end wall having an opening extending vertically from the top to the bottom thereof adapted to receive a handle therethrough, a crate floor, said floor extending under the end wall, an opening in said floor registering with said end wall opening and extending under said end wall to one side of said wall opening, and a cut-out in said end wall to said one side of said wall opening extending upwardly from the bottom edge of said end wall directly above said floor opening and outwardly in the horizontal direction along the bottom edge of said one side substantially beyond said floor opening in both directions, and a generally U-shaped resilient handle of a width to fit through said floor opening with its closer end up when the legs of the handle are compressed inwardly from their normal positions, and of a length to extend upwardly beyond the top edge of the end wall when engaged therein, said legs each terminating in a foot extending in a direction perpendicular to the plane of the body of said handle to the same side thereof, whereby, when said handle is inserted and moved upwardly through said floor and end wall openings beyond said floor opening, said handle legs spring outwardly to position said feet to the outside of said floor opening on opposite sides thereof where they each engage the crate floor, below, and the bottom edge of said inner side at the cut-out, above.

12. A crate construction comprising a crate having a floor and a multi-ply end wall including two spaced plies, said floor extending to and under the inner of said spaced plies, a web forming the top edge of said end wall and connecting said two spaced plies in spaced relation, vertically aligned openings in said web of said end wall and in said crate floor registering with the space between said two spaced plies, said opening in the crate floor extending inwardly of said end wall beyond the inner of said two spaced plies, a cut-out in the bottom edge of said inner of said two spaced end wall plies directly above said floor opening and extending outwardly horizontally along the bottom edge of said inner spaced ply substantially beyond said floor opening in both directions, and a generally U-shaped resilient handle of a width to fit through said vertically aligned openings with its closed end up when the legs of the handle are compressed inwardly from their normal positions, and of a length to extend upwardly beyond the top edge of the end wall when engaged therein, said legs each terminating in a foot extending in a direction perpendicular to the plane of the body of said handle to the same side thereof, whereby, when said handle is inserted and moved upwardly through said vertically aligned openings in said end wall beyond said opening in the crate floor, said handle legs spring outwardly to position said feet to the outside of said floor opening on opposite sides thereof where they each engage the crate floor, below, and the bottom edge of the inner ply at the cut-out, above.

References Cited in the file of this patent

UNITED STATES PATENTS

| | | |
|---|---|---|
| 2,944,722 | Dalhauser et al. | July 12, 1960 |
| 3,017,064 | Davis | Jan. 16, 1962 |